Feb. 9, 1965 R. R. DAVIS 3,168,964
ARTICLE DISPENSING DEVICE
Filed Oct. 4, 1963 2 Sheets-Sheet 2
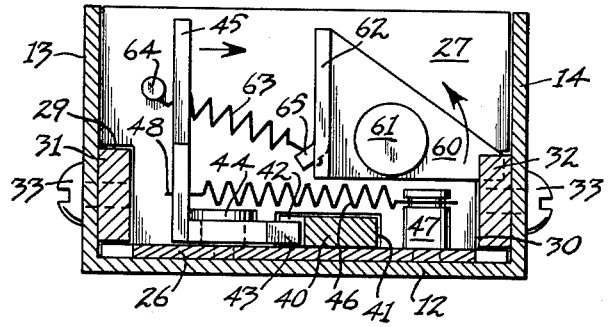
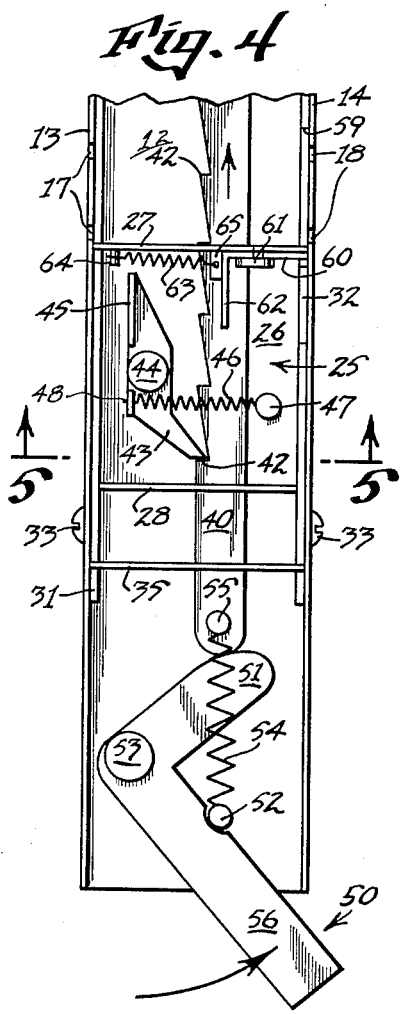
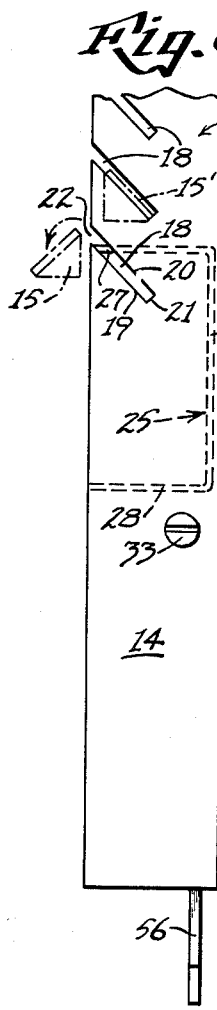
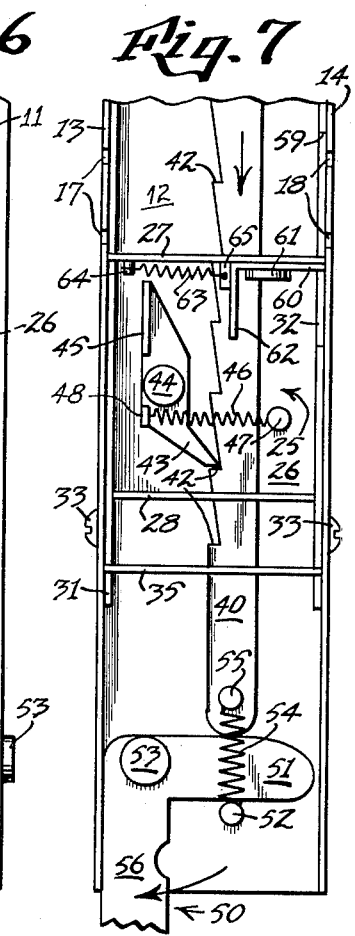
INVENTOR:
RALPH R. DAVIS
BY
Harrington A. Lackey
ATTORNEY

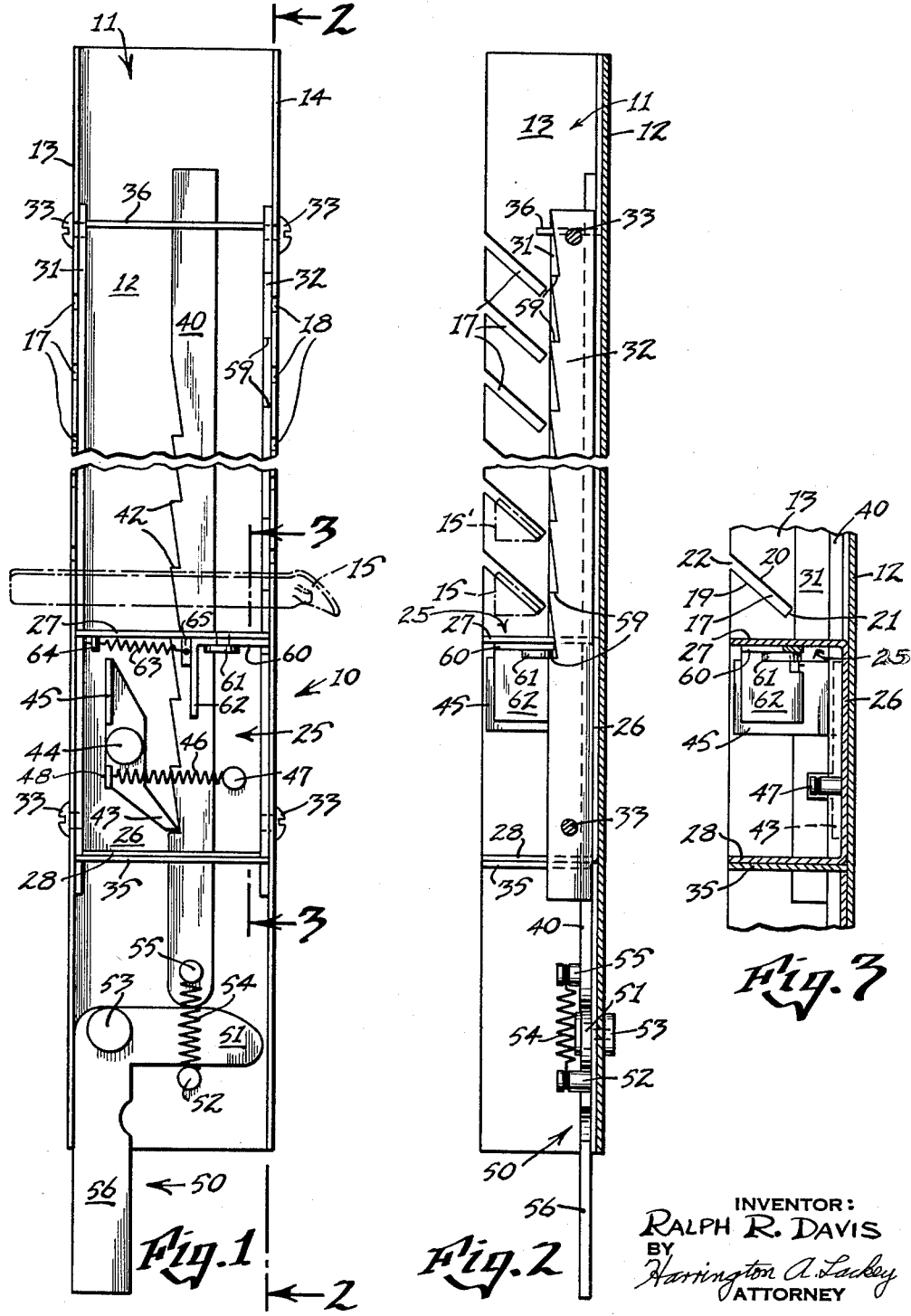

United States Patent Office 3,168,964
Patented Feb. 9, 1965

3,168,964
ARTICLE DISPENSING DEVICE
Ralph R. Davis, Rte. 4, Canton, Ga.
Filed Oct. 4, 1963, Ser. No. 314,007
4 Claims. (Cl. 221—88)

This invention relates to an article dispensing device, and more particularly to a device for dispensing solid articles one at a time from a magazine.

One object of this invention is to provide a device for progressively dispensing one article at a time from a magazine in which the articles are supported in spaced relation in the magazine.

Another object of this invention is to provide a device for dispensing rigid articles in which the discharging mechanism acts in a single direction to engage the article and force the article against a camming surface for discharging the article in a direction different from the directional movement of the discharging member.

A further object of this invention is to provide a dispensing device having a rack including sloping slots for receiving solid articles in vertically spaced relationship, and an ejector member for moving vertically to engage each article successively to lift and discharge the article from its corresponding slot.

Another object of this invention is to provide a device for dispensing articles supported in spaced relationship including novel means for discharging the articles one at a time from their supporting means.

Another object of this invention is to provide a novel device for dispensing elongated rigid articles one at a time from a specially constructed article supporting means.

Another object of this invention is to provide an article dispensing device including a rack for supporting articles in vertical spaced relationship, a discharge member for moving upward one vertical space at a time to discharge one article at a time, and means to facilitate the return of the discharge member to its original position after the articles have been exhausted and to facilitate reloading the rack.

Further objects and advantages of the invention will be apparent from the following description taken in conjunction with the drawings, wherein:

FIG. 1 is a front elevational view of the dispensing device supporting a can opener in phantom, and with the ejector plate in its lowest position;

FIG. 2 is a section taken along the line 2—2 of FIG. 1;

FIG. 3 is a section taken along the line 3—3 of FIG. 1;

FIG. 4 is a fragmentary front elevational view similar to FIG. 1, but disclosing the ejector plate in operative position for discharging an article from the lowermost slot;

FIG. 5 is a section taken along the line 5—5 of FIG. 4;

FIG. 6 is a side view of the device in its operative position disclosed in FIG. 4, showing a can opener, in phantom, being discharged from the lowermost slot; and FIG. 7 is a view similar to FIG. 4 disclosing the ejector plate being held in its first operative position after discharging an article, while the lift bar and actuator lever are returned to their original inoperative position.

Referring now to the drawings in more detail, the dispensing device 10 includes an elongated vertically disposed channel-shaped rack or magazine 11 including a back wall 12 and a pair of opposed side walls 13 and 14. Since the device 10 shown in the drawings is particularly designed, by way of example, to dispense can openers 15 of the type disclosed in phantom in FIGS. 1, 2 and 6, the side walls 13 and 14 are provided with a plurality of vertically spaced sloping slots 17 and 18, respectively. It will be noted that the slots 17 and 18 are horizontally aligned in order to support the can opener 15 horizontally across the racks. Also, each slot is of uniform dimensions and of substantially uniform thickness to accommodate the uniform thickness of the can opener 15. Each slot, such as 17 (FIG. 3) has parallel bottom and top surfaces 19 and 20, which are shown as sloping at approximately a 45 degree angle to the vertical. Moreover, the slot 17 includes a closed bottom end 21 and an opening 22 above the closed bottom end 21.

Mounted to slide vertically within the channel-shaped rack 11 is a substantially U-shaped ejector member 25 having a back plate 26 adapted to slide against the back plate 12 of the rack 11, a top ejector plate or flange 27, and a bottom flange 28, as best disclosed in FIG. 6. A recess 29 is provided in one edge of the top ejector plate 27 for receiving the vertical guide bar 31 fixed to the left side wall 13, and a similar recess 30 is provided in the opposite side edge of the ejector plate 27 to receive the vertically disposed hold ratchet bar 32 fixed to the right side wall 14 of the rack 11. Recesses similar to 29 and 30 are also provided in the bottom flange 28 to accommodate the bars 31 and 32 so that the ejector member 25 may be retained in the channel-shaped rack 11 for vertical movement. The bars 31 and 32 may be secured to their respective side walls 13 and 14 by any convenient means, such as the screws or bolts 33.

To limit the vertical movement of the ejector member 25, a stationary bottom mounting plate 35 is fixed transversely within the bottom portion of the channel-shaped rack 11 and may be fixed by any convenient means, such as by welding or otherwise, to the side walls 13 and 14, and also to the back wall 12, if desired. As shown in FIGS. 1 and 2, the bottom flange 28 of the ejector member 25 is adapted to rest upon the top of the bottom mounting plate 35 in its lowermost position. An upper stop or strike plate 36 similar to the bottom mounting plate 35 is mounted in the upper portion of the rack 11 by similar means to limit the upward movement of the ejector member 25 by engaging the top of the ejector plate 27.

In order to elevate the ejector member 25, an elongated lift bar 40 may be mounted for vertical slidable movement in the rack 11, such as by extending the bar 40 through mating apertures, not shown, in the bottom mounting plate 35 and the upper strike plate 36. Moreover, the lift bar 40 is adapted to freely reciprocate through a mating recess 41 in the ejector plate 27, and through a similar slot in the bottom flange 28 of the ejector member 25. As best disclosed in FIG. 1, the left edge of the lift bar 40 is provided with upwardly directed uniformly spaced ratchet teeth 42. Adapted to engage teeth 42 is a lift pawl 43 pivotally mounted by the pin 44 for rotational movement in a vertical plane on the back wall 26 of the ejector member 25. The pawl 43 is provided with a handle or thumb lever 45 for manipulation of the pawl 43. The pawl 43 is normally biased into engagement with a mating ratchet tooth 42 by means of a spring 46 fixed at one end to the back wall 26 by a member such as 47, and at its other end to the pawl 43 at a point 48 below the pivot pin 44. Thus, when the lift bar 40 is moving upward, the engagement of one of its ratchet teeth 42 with the pawl 43 will cause the ejector member 25 to move upward with the lift bar 40.

In order to elevate the lift bar 40, an actuator bellcrank lever 50 has a normally horizontally disposed arm 51 engaging the bottom end of the lift bar 40. The bottom edge of the arm 51 normally rests upon a stop pin 52 fixed to the back wall 12 of the rack 11. The actuator lever 50 is pivotally mounted by the pin 53 to the back wall 12. A tension spring 54 is connected at one end to the stop member 52 and at its other end to a pin 55 fixed at the bottom portion of the lift bar 40. Thus, by thrusting the depending bar 56 to the right, as disclosed in FIG. 4 by any convenient mechanism, such as push bar or coin slot mechanism, the arm 51 will also be rotated about the pin 53 to raise the lift bar 40 and consequently the ejector member 25. The length of the arm 51 and its radial distance from the pivot pin 53 is preferably adapted to raise bar 40 so that the ejector plate 27 will move a distance substantially equal to the vertical spacing between a pair of the slots 17 and 18. As the depending arm 56 is rotated to the right, the spring 54 will be stretched in tension, so that when the depending arm 56 is released, the spring 54, as well as the weight of the bar 40, will return the bar to its original position. Spring 54 is primarily designed to maintain the bottom of the lift bar 40 in constant engagement with the top of the lift arm 51.

In order to latch the ejector member 25 in its elevated position disclosed in FIG. 4, the hold ratchet bar 32 is provided with ratchet teeth 59, for engagement by a pawl 60 pivotally mounted on pin 61 supported on the bottom of the ejector plate 27. A handle or finger lever 62 is fixed on the pawl to depend therefrom and be substantially horizontally spaced from the thumb lever 45. Thus, the finger lever 62 may be easily grasped by the forefinger, and the thumb lever 45 may be easily grasped by the thumb of the same hand, to manually squeeze both levers together to pivot the respective pawls 43 and 60 out of engagement with their respective ratchet teeth 42 and 59. The pawl 60 maintains engagement with a corresponding tooth 59 by means of spring 63 connected at one end to a member 64 fixed in the ejector plate 27, and its other end to a struck out portion 65 in the finger lever 62.

In the operation of this invention, the parts are in their initial position disclosed in FIGS. 1, 2 and 3, in which the ejector member 25 is in its lowermost position with the bottom flange 28 resting upon the mounting plate 35. The lift bar 40 is also in its lowermost position, resting upon the lift arm 51 of the actuator lever 50, substantially as shown in FIG. 1. Moreover, both pawls 43 and 60 are biased toward engagement with their respective ratchet teeth 42 and 59 by their respective springs 46 and 63. Furthermore, each pair of opposed slots 17 and 18 at each vertical station is filled with an article, such as a can opener 15, to be dispensed.

When it is desired to dispense one of the articles, the depending arms 56 of the actuator lever 50 is thrust toward the right, as disclosed in FIG. 4, by any convenient means, not shown, such as a coin operated mechanism, pusher bar, or plunger. As the depending arm 56 is rotated about the pivot pin 53, the lift arm 51 is rotated upward against the tension of the spring 54 to elevate the lift bar 40. Since the pawl 43 engages the lowermost tooth 42 (FIGS. 1 and 4), and since the pawl 43 is fixed to the ejector member 25 by means of the pivot pin 44, the ejector member 25 will rise simultaneously with the lift bar 40.

As the ejector member 25 is elevated, the ejector plate 27 will also rise until it engages the article 15 at the bottom end 21 of the slot 18, and the corresponding bottom end of the slot 17. Continued upward movement of the ejector plate 27 forces the article 15 upwardly through the slots 17 and 18. If the frictional engagement between the article 15 and the bottom slope 19 is great enough, the upward thrust of the ejector plate 27 will force the article 15 against the upper slope 18 causing the article to cam forwardly as it is being raised, until the article is thrust forward and out through the opening 22 of the slot 18 and the corresponding opening in the opposing slot 17. If the frictional engagement between the article 15 and the bottom slope 19 of the slot 18 is only slight, then the article will slide upwardly and forwardly along the bottom slope 19 without the assistance of the upper slope 20. Thus, the necessity of the upper surface 20 to guide an article being dispensed, will depend upon the weight of the article, the frictional forces exerted between the bottom slope 19 and the article 15, and the angle of the slope 19.

After the ejector plate 27 has discharged the article 15 through the opening 22, as best disclosed in FIG. 6, the hold pawl 60, which rides upwardly along the front edge of the ratchet bar 32 will register with the next higher ratchet tooth 59, so that it will automatically latch the ejector member 25 in its elevated position at the first discharge station, disclosed in FIGS. 4, 6 and 7. With the ejector member 25 thus latched, the lift bar 40 is free to follow the lift arm 51 to its original position disclosed in FIG. 7, with the pawl 43 riding along the left edge of the lift bar 40 until it engages the next higher ratchet tooth 42.

The dispensing device 10 is now in position for being actuated again to dispense the next article 15' (FIG. 6) at the second elevated discharge station. The process may be repeated until all of the articles have been discharged and the actuator member 25 has reached its upper limit with the ejector plate 27 abutting against the strike plate 36 and the pawl 43 engaging the highest ratchet tooth 42. At this point, all of the slots in the magazine or rack 11 are empty, and the ejector member 25 may be returned to its lowermost position disclosed in FIG. 1 by squeezing the thumb lever 45 and finger lever 62 together to release the respective pawls 43 and 60 from their respective ratchet teeth 42 and 59. The slots 17 and 18 are then reloaded with articles 15 and the operation of the dispensing device amy be repeated.

It is also within the scope of this invention to substitute sloping supports having other shapes in order to accommodate other rigid articles, such as cardboard packages or paper wrapped packages of rigid merchandise, such as candy bars, so that they may be supported on upwardly sloped shelves, notches or slots, in such a manner that they may be elongated and thrust laterally by the upwardly moving ejector plate 27. Where frictional engagement between the the articles and the lower sloping surfaces is sufficiently great, the upper sloping guide surfaces 20 are necessary for camming the article laterally at the same time that they are being thrust upwardly by the ejector plate 27. Thus, it will be noted that the active discharge member for dispensing the article moves in a single direction and that is upward. Consequently no laterally moving individual pusher plate or rods are necessary for discharging each individual article. Thus, the construction of this invention is simple and economical because it employs a minimum number of elements, particularly moving parts.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. An article dispensing device comprising:
 (a) a rack for supporting a plurality of articles,
 (b) a plurality of uniformly vertically spaced slots in said rack,
 (c) each slot having a bottom portion for supporting an article and an upper opening to permit the passage of said article therethrough,
 (d) each slot sloping at substantially the same angle to the vertical,
 (e) the bottom portion of each slot being above the opening of the next lower slot,
 (f) an ejector member mounted for vertical movement on said rack and for successively engaging articles supported in said slots,
 (g) means operable to elevate said ejector member through successive uniform increments, each increment substantially equal to the spacing between said slots, to lift and discharge from each slot one article at a time, (h) means operable to hold said ejector member at a stationary elevated position on said rack after each article discharge, and (i) means for rendering said elevating means and said holding means inoperative to lower said ejector member on said rack.

2. The invention according to claim 1 in which said operable elevating means comprises a lift bar mounted for vertical reciprocation along said rack, said lift bar being provided with stepped means for engaging and lifting said ejector member through successive increments, an actuator lever pivotally mounted on said rack for reciprocably moving said lift bar through one increment.

3. The invention according to claim 1 in which the articles to be dispensed are elongated, and a pair of said slots are disposed in horizontal spaced alignment for receiving such article, said ejector member being adapted to move vertically between said aligned slots for engaging each article.

4. The invention according to claim 1 in which each slot slopes substantially at an angle of 45° to the vertical.

References Cited by the Examiner
UNITED STATES PATENTS

| | | | |
|---|---|---|---|
| 1,004,856 | 10/11 | Davies | 221—90 |
| 2,203,847 | 6/40 | Steiner | 221—90 |
| 2,957,604 | 10/60 | Goldman | 221—88 |

FOREIGN PATENTS

| | | |
|---|---|---|
| 833,460 | 4/60 | Great Britain. |

LOUIS J. DEMBO, *Primary Examiner.*

HADD S. LANE, *Examiner.*